US005765697A

United States Patent [19]
Soong

[11] Patent Number: 5,765,697
[45] Date of Patent: Jun. 16, 1998

[54] DESKTOP ORGANIZER

[76] Inventor: David Soong, 34 Magnolia St., Bergenfield, N.J. 07621

[21] Appl. No.: 812,047

[22] Filed: Mar. 6, 1997

[51] Int. Cl.⁶ .................................................. A47F 5/00
[52] U.S. Cl. ........................... 211/11; 211/40; 211/43; 211/194
[58] Field of Search ............................. 211/40, 41.12, 211/43, 59.3, 51, 194, 188, 11

[56] References Cited

U.S. PATENT DOCUMENTS

| | | | |
|---|---|---|---|
| 2,738,881 | 3/1956 | Michel | 211/43 X |
| 4,300,693 | 11/1981 | Spamer | 211/59.3 |
| 4,907,707 | 3/1990 | Crum | 211/59.3 |
| 5,069,349 | 12/1991 | Wear et al. | 211/59.3 |
| 5,366,099 | 11/1994 | Schmid | 211/194 X |
| 5,415,297 | 5/1995 | Klein et al. | 211/194 X |
| 5,487,599 | 1/1996 | Weisburn et al. | 211/194 X |

FOREIGN PATENT DOCUMENTS 1358009  6/1974  United Kingdom ............... 211/43

*Primary Examiner*—Robert W. Gibson, Jr.
*Attorney, Agent, or Firm*—Richard A. Joel

[57] ABSTRACT

A desktop organizer, particularly for CD's and computer discs, comprises an elongated base having a track with a slot extending axially therealong, end walls supporting the base and a rear wall extending perpendicularly between the end walls and parallel to the base. A support member includes a coiled spring mounted within an upper recess and affixed at its lower end within the base slot for spring urged movement of the support member to and fro along the base. The coiled spring provides a resilient force to the upwardly extending support member to maintain objects on the base between the support member and one of the end walls. The support member and associated track are detachable and may be reassembled along the rear wall or in the opposite direction along the base. The organizer may be mounted on a turntable and includes a plurality of legs mounted to the end members which permit stacking of several organizers or positioning of the organizer at a particular height. A cover member may also be provided to join adjacent organizers together in a side by side relationship.

11 Claims, 6 Drawing Sheets

DESKTOP ORGANIZER

BACKGROUND OF THE INVENTION

The present invention discloses a desktop organizer for computer discs and CDs which is extremely flexible and inexpensive. Indeed the organizer is specifically designed to be coupled to other similar organizers for flexibility and the retaining support of the organizer may be mounted in any one of several positions.

The prior art includes various patents related to the storage of containers such as U.S. Pat. No. 2,738,881 which shows means to grip the first of a row of containers against an abutment. Another patent of note is U.S. Pat. No. 3,398,805 on self-adjusting telescoping bookends wherein a spring couples moving and stationary sections to maintain books in position. U.S. Pat. No. 5,161,702 shows the use of a coil spring in a display device while U.S. Pat. No. 4,162,013 discloses a book rack with a slidable end.

Other patents of interest include U.S. Pat. Nos. 4,135,626; 153,227; 5,415,297; 4,606,465; 5,228,578; and, 5,217,122. None of the foregoing patents disclose anticipatory subject matter which would affect the patentability of this invention.

SUMMARY OF THE INVENTION

This invention relates to desktop organizers and particularly to a new a improved desktop organizers for CDs and computer discs.

This desktop organizer proposed by this invention comprises an elongated base having a slotted track mounted therealong and a resiliently backed support member mounted on the track. The base is attached to end walls extending perpendicular to the base while a rear wall extends parallel to the track between the end walls. The support member includes an upper recess within which one end of a coiled spring is mounted and a slot within which the spring extends downwardly to be affixed to the track at its other end. The spring backed support member maintains CDs and the like against the end wall. The track with the support member mounted thereon may be detached and reassembled on the rear wall or in the opposite direction on the base.

The end walls each include vertical apertures at each corner so that supporting legs can be inserted to raise the organizer to a predetermined level or on an incline, and to permit the mounting of organizers in a vertical array. The organizers can also be mounted side by side with a cover coupling. For ease of usage, one or more organizers may be mounted on a platform which is coupled to a turntable for rotatable movement. The invention thus provides an inexpensive flexible and attractive means to store discs for use.

Accordingly, an object of this invention is to provide a new and improved desktop organizer.

Another object of this invention is to provide a new and improved desktop organizer for CDs and computer discs including a spring urged support means which may be positioned in a number of different positions for flexibility maintaining the discs against an end wall.

A further object of this invention is to provide a new and improved desktop organizer which may be readily coupled in a vertical or horizontal array with other organizers.

A more specific object of this invention is to provide a new and improved desktop organizer for discs including a detachable track having a spring urged support member thereon to maintain the discs in position on the organizer and means for rotating the organizer to expose a second organizer.

BRIEF DESCRIPTION OF THE DRAWINGS

The above and other objects and advantages of the present invention may be more clearly seen when viewed in conjunction with the accompanying drawings wherein.

DETAILED DESCRIPTION OF THE INVENTION

Figure 1:
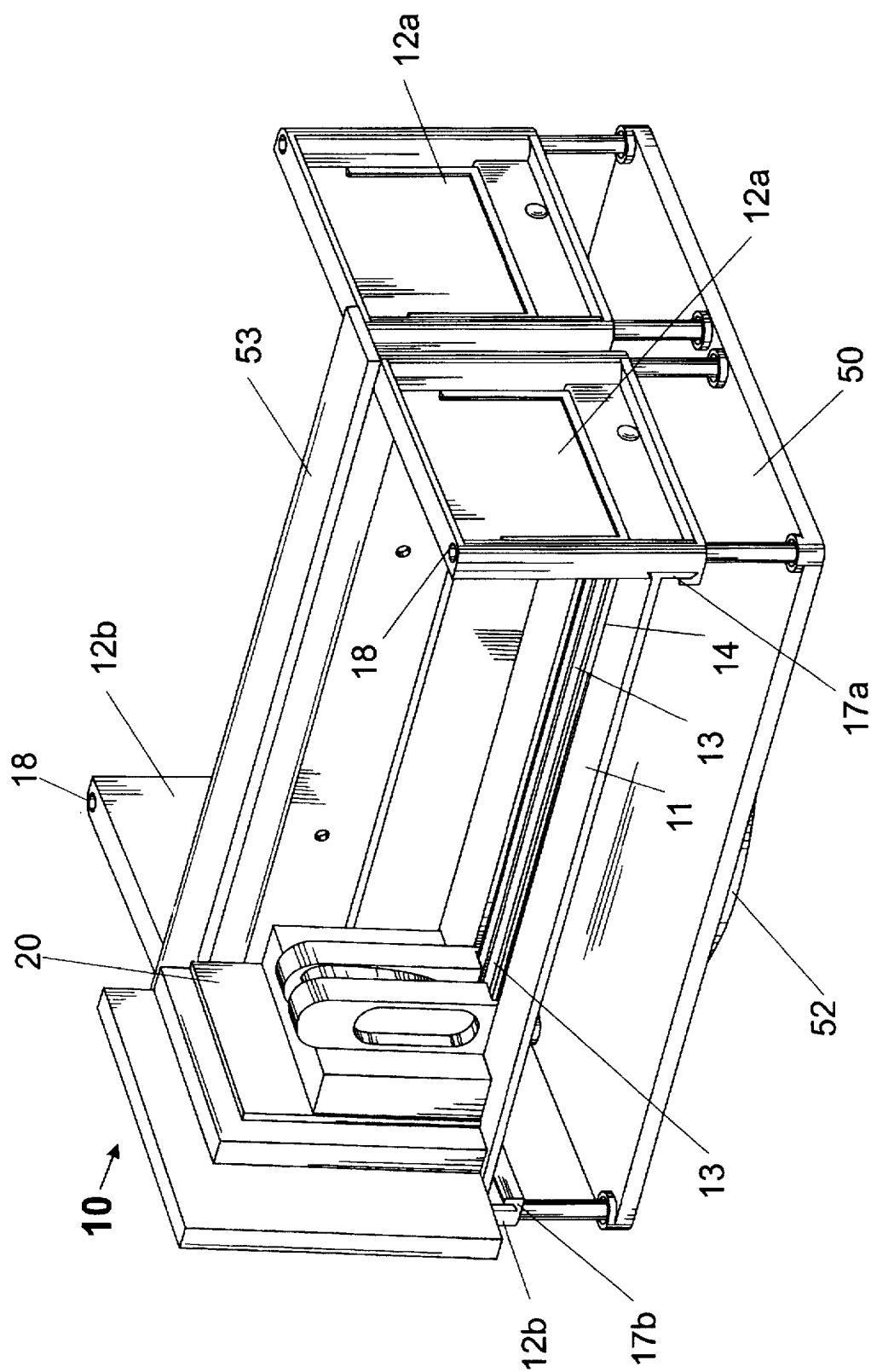
FIG. 1 is a perspective view of a pair of desktop organizers mounted together in a side by side relationship on a turntable.
Figure 2:
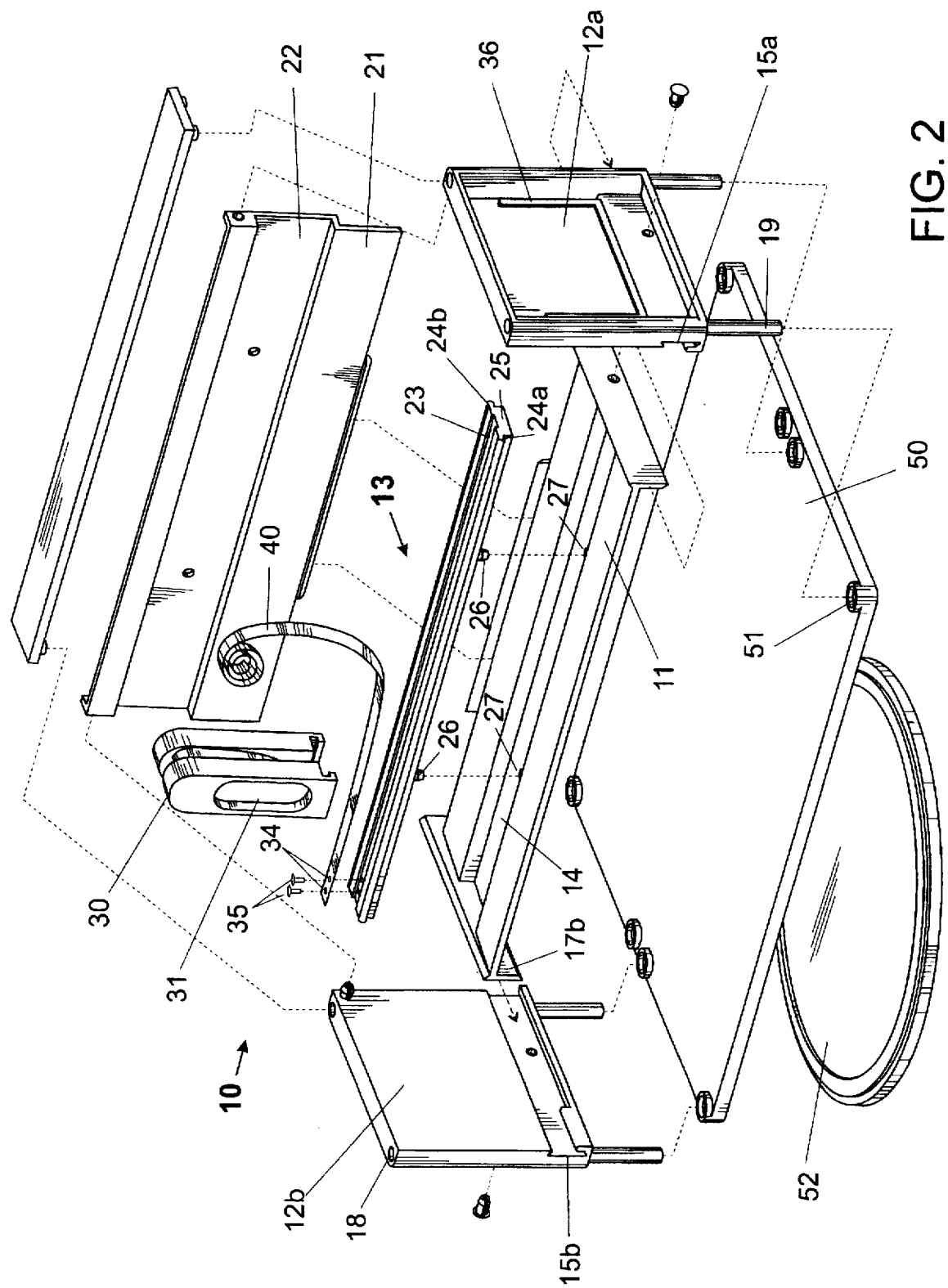
FIG. 2 is an exploded view of a desktop organizer comprising the invention and including a turntable.

Referring now to the drawings, the invention comprises a desktop organizer 10 for items such as computer discs, CD's, 20 etc. The organizer 10 comprises a base 11 having end wall members 12a and 12b mounted thereto and an elongated track 13 extending between the end wall members 12a, 12b. The base 11 includes a slot 14 within which the track 13 may be mounted. The end 17a, 17b of the base 11 projects downwardly and engage a slot 15a, 15b in each and end wall. The end walls 12a, 12b each comprise a substantially rectangular member having vertically extending apertures 18 into which support rods 19 are fitted. The organizer 10 also includes a rear wall 21 which mounts to the end walls 12a and 12b and includes a recess 22 within which a track 13 may be mounted.

Figure 3:
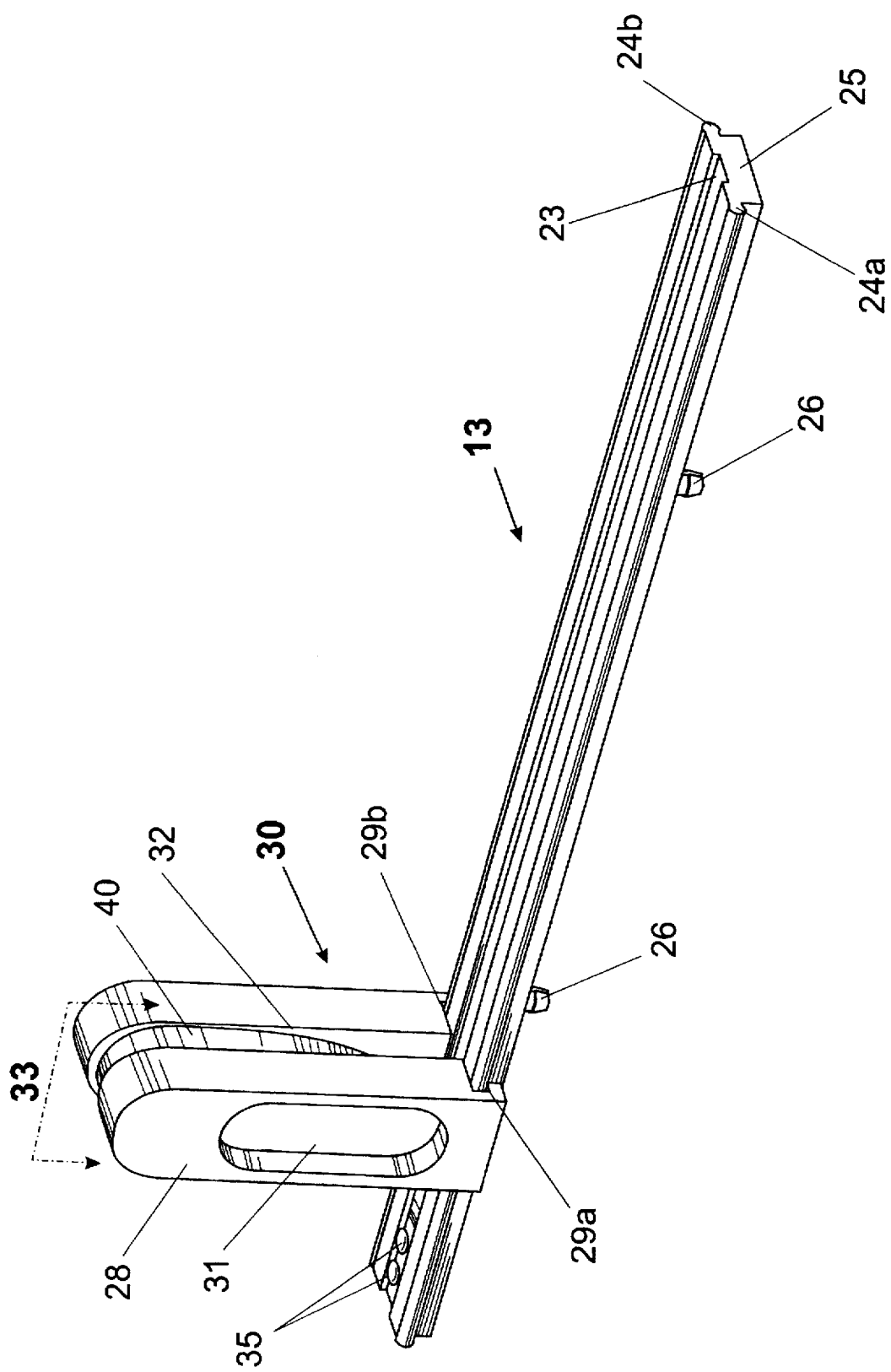
FIG. 3 is a perspective view of the support and track unit of the organizer.
Figure 4:
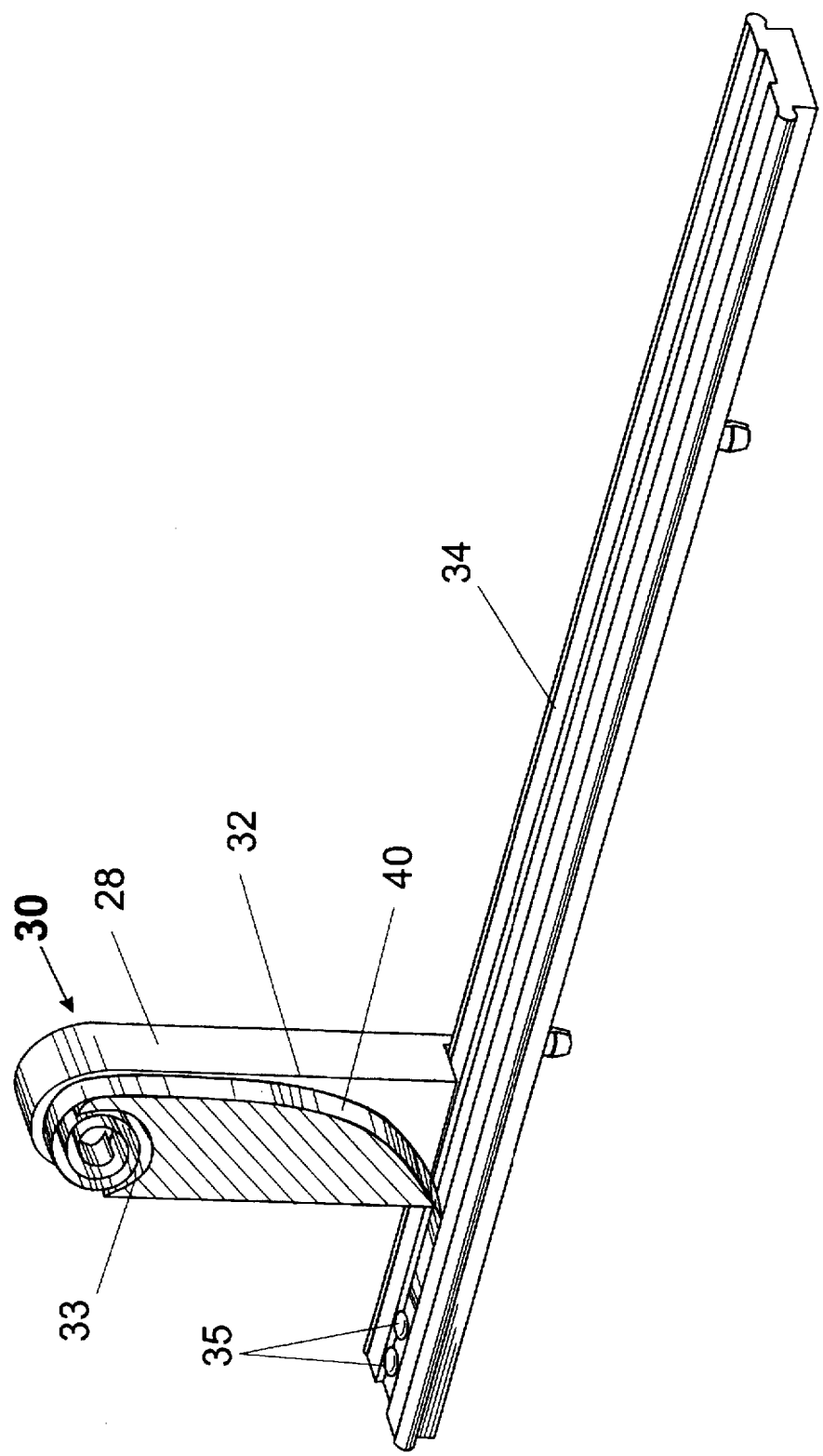
FIG. 4 is a cut away view of the support member along the line 4—4 of FIG. 3 showing the coiled spring positioned therein.

As shown in FIGS. 3 and 4, the track 13 includes a slot 23, outwardly extending flanges 24a, 24b and an elongated frame 25 which includes a downward mounting projections 26 which engages apertures 27 in the base slot 14. A support 30 extends upwardly from the track 13 and includes a main body portion 28 having recesses 29a, 29b at its lower end which engage the flanges 24a, 24b for movement along the track 13. The support 30 also includes an oval aperture 31 for grasping the support 30 and a central recess 32 leading to a cavity 33 within which a coiled spring 40 is located. The spring 40 extends outwardly within the recess 33 and is secured at its end 34 to the track slot 23 by mounting means 35. The spring 40 thus provides resilient backing for the support 30 to hold discs 20 against the end wall 12b. The end wall 12a also includes a slot 36 which comprises a business card holder.

Figure 5:
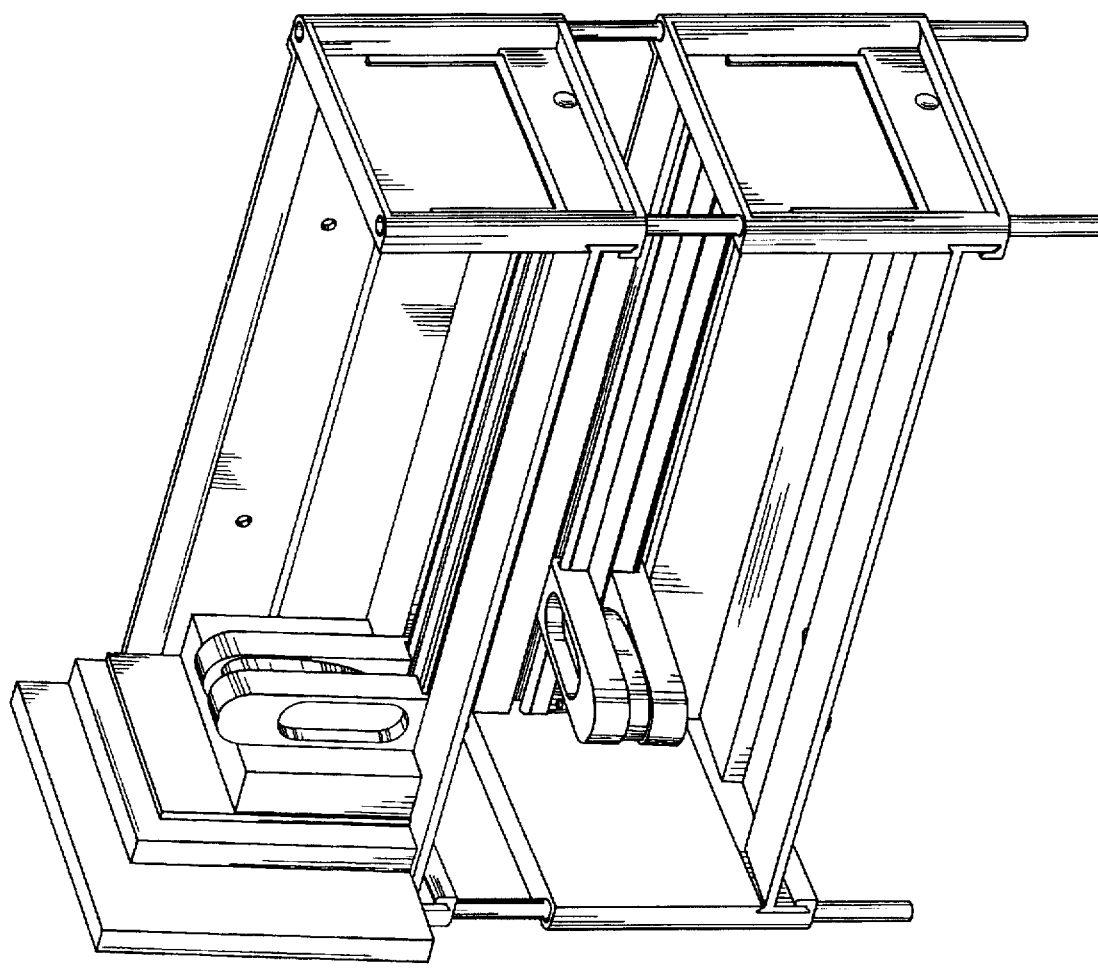
FIG. 5 is a perspective view of a pair of organizers mounted in a vertical array with the track and support member mounted on the base in one instance and on the rear wall in the other instance; and, FIG. 6 is a perspective view of a pair of organizers mounted vertically wherein each organizer except for the track assembly and legs is molded as a single part.

The track 13 and support 30 may be detached from the base 11 and reassembled either in the opposite direction to hold discs 20 against the end wall 12a or on the rear wall 21, see FIG. 5, if a different size object is being positioned on the base 11. For flexibility, the support rods 19 may be of varying lengths to provide an incline for the organizer 10 or a particular height. Further, as shown in FIG. 5, the organizer 10 may be mounted vertically to a second organizer 10 utilizing by engaging the apertures 18 in the end walls 12a, 12b with the rods 19.

The organizer 10 may also include a platform 50 having a plurality of apertures 51 to be engaged by the support rods 19. The platform 50 is positioned on a turntable 52 so that the organizer can be rotated as desired by a user. In addition to the vertical mounting of organizers 10 shown in FIG. 5, the organizers 10 may be mounted side by side with a cover bracket 53 joining the end walls 12a and 12b of adjacent organizers 10. The organizers 10 may then be rotated on the turntable 52 to bring the desired organizer 10 into position before the user.

The organizer 10 is inexpensive and may be readily assembled of attractive plastic materials. Furthermore, it is relatively simple to detach and reassemble the track 13 in a different position. The support 30 provides a convenient means for stacking discs 20 or books, etc. on the base 11. The turntable 52 is a further advantage as well as the ease of stacking organizer's in a side by side or vertical relationship.

Figure 6:
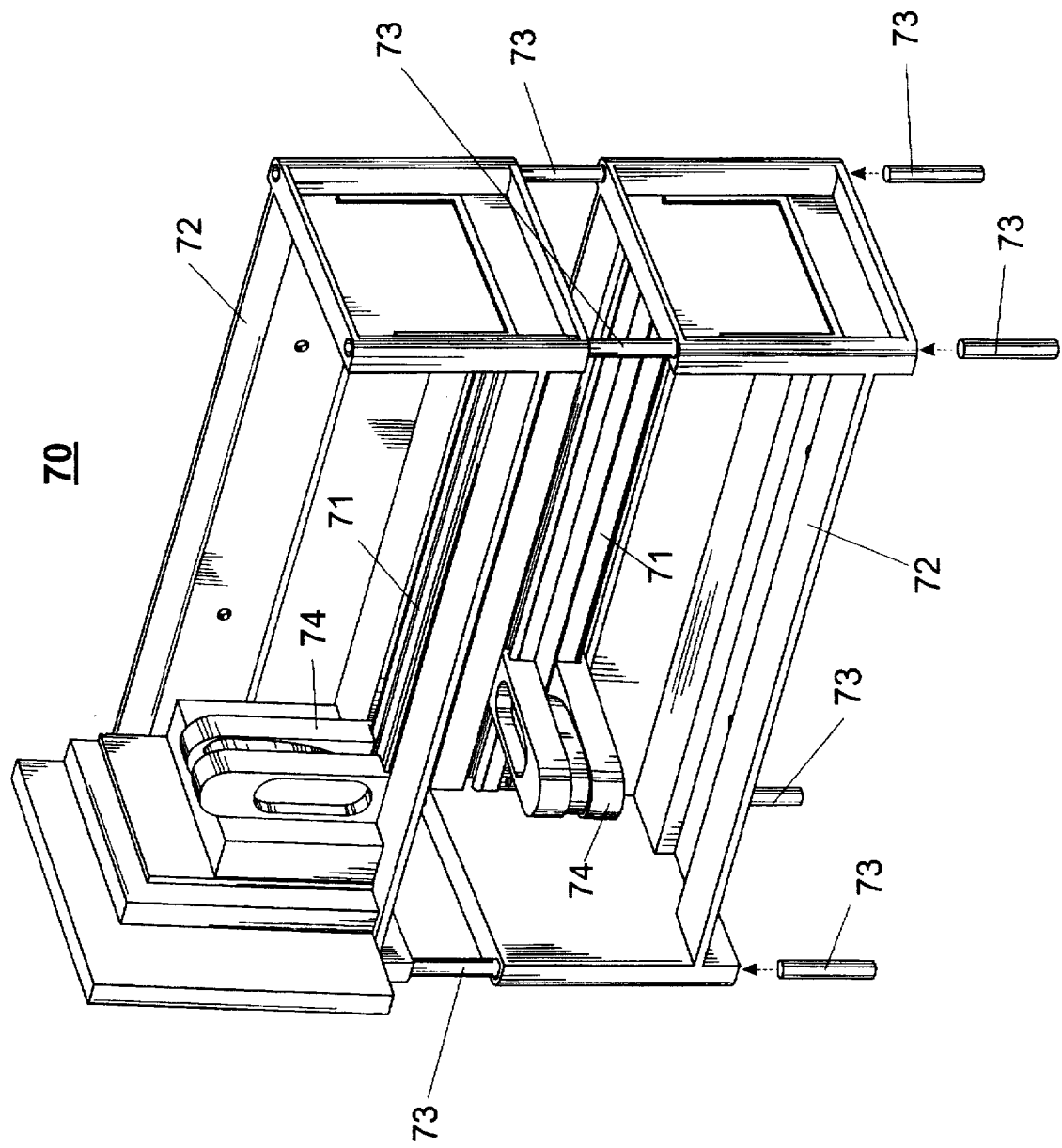

FIG. 6 illustrates an organizer 70 which is mounted vertically with another organizer 70 utilizing legs 73. The organizer 70, except for the track assembly 71 having the support 74 mounted thereon, is a single one piece molding. This eliminates the need for assembly of the parts shown in FIGS. 1–5 and results in a considerable cost savings. The track assembly 71 may still be mounted in various positions as shown in FIG. 6. It is also to be noted that the legs 73 could be permanently affixed to the organizers 70 but in that instance, it may be preferably that the legs 73 be hinged to permit folding for shipping purposes.

While the invention has been explained by a detailed description of certain specific embodiments, it is understood that various modifications and substitutions can be made in any of them within the scope of the appended claims which are intended also to include equivalents of such embodiments.

What is claimed, is:

1. A desktop organizer particularly for CDs and computer discs comprises:

an elongated base having a recess extending therealong and first and second end portions;

an end wall connected to and supporting the base at each end;

an elongated rear wall extending between and coupled to the end walls, said rear wall including a longitudinal recess extending therealong; and, a track assembly detachably mounted in the recess on the base, said track assembly including an elongated track extending along the base and a support member extending upwardly from the track and slideably mounted thereto, said support member including spring means mounted therein to bias the support member towards an end wall to maintain discs on the base against said wall.

2. A desktop organizer particularly for CDs and computer discs in accordance with claim 1 wherein:

the support member comprises a frame member projecting upwardly from the track having a recess parallel to the track and an upper portion having a cavity, and said spring means comprises a coiled spring mounted within the cavity and extending downwardly along the recess to be mounted to the track to bias the support member towards an end wall.

3. A desktop organizer particularly for CDs and computer discs in accordance with claim 2 wherein:

the end walls each include a top and a bottom and corners having vertical apertures extending therewithin; and, a plurality of legs one of said legs mounted to each of the bottom apertures and extending outwardly therefrom to position the rack at a predetermined height.

4. A desktop organizer particularly for CDs and computer discs in accordance with claim 3 further including:

a second organizer similar to the first organizer and, a leg mounted in each of the top apertures in the end walls of the first organizer and coupled to the second organizer to mount the organizers in a vertical array.

5. A desktop organizer particularly for CDs and computer discs in accordance with claim 3 further including:

a base having a plurality of apertures positioned to engage the legs extending outwardly from the bottom apertures in the end walls; and, a turntable having the base positioned thereon to rotate the organizer for positioning purposes.

6. A desktop organizer particularly for CDs and computer discs in accordance with claim 2 wherein:

the track includes an elongated frame a central recess extending axially along said frame and a flange extending outwardly on each side of the frame; and, the support member includes a slot on each side of the frame member to engage the track flanges for movement along said track and to maintain the support member in position on the track.

7. A desktop organizer particularly for CDs and computer discs in accordance with claim 2 wherein:

the base includes a downwardly extending flange at each end portion and the end walls each include a transverse slot to be engaged by the flange.

8. A desktop organizer particularly for CDs and computer discs in accordance with claim 1 wherein:

the detachable track assembly is mounted in the longitudinal recess on the rear wall.

9. A desktop organizer particularly for CDs and computer discs in accordance with claim 3 further including:

a second organizer; and;

an elongated top member mounted to the adjacent top apertures in the organizers to position the organizers in a side by side relationship.

10. A desktop organizer particularly for CDs and computer discs in accordance with claim 6 wherein:

the support member includes a transverse recess for gripping purposes.

11. A desktop organizer particularly for CDs and computer discs in accordance with claim 1 wherein:

the base, end walls and the rear wall comprise a single one piece molding.

* * * * *